Figure 1:
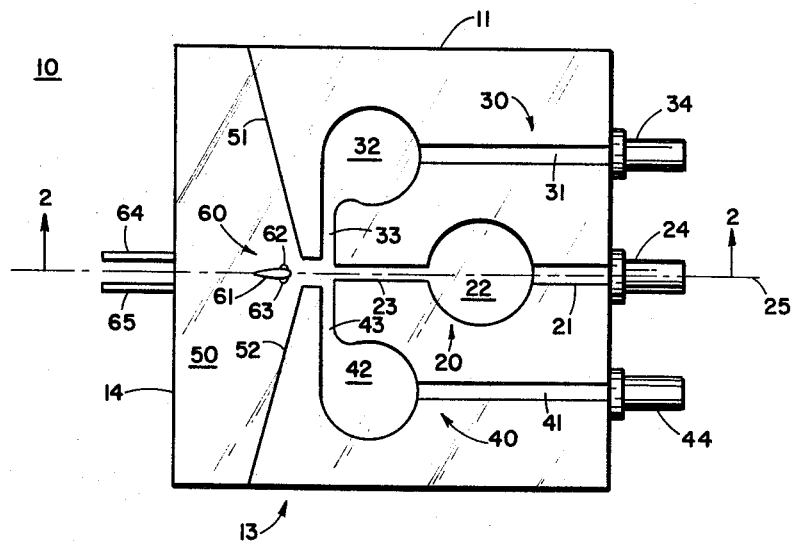

March 2, 1965   R. A. EVANS   3,171,422
CONTROL APPARATUS
Filed July 10, 1962

*INVENTOR.*
RICHARD A. EVANS
BY Roger W. Jensen
ATTORNEY.

United States Patent Office 3,171,422
Patented Mar. 2, 1965

3,171,422
CONTROL APPARATUS
Richard A. Evans, Columbia Heights, Minn., assignor to Honeywell Inc., a corporation of Delaware
Filed July 10, 1962, Ser. No. 208,822
7 Claims. (Cl. 137—81.5)

This invention pertains to control means, and more particularly to fluid amplifier control means.

"Fluid amplifier" is a generic term which describes a control means which functions to provide amplification of a fluid signal. However, in this application, the term fluid amplifier will be used to define a particular type of fluid amplifier which facilitates the deflection and the control of a relatively high energy stream of fluid by another stream of fluid of relatively low energy. This definition does not include a vortex fluid amplifier. A fluid amplifier of the type defined is generally divided into two general classifications: (1) bistable, and (2) proportional. A bistable fluid amplifier produces a high energy fluid flow in one of two output passages. A relatively low energy control signal causes the high energy fluid flow to be deflected to a particular output passage. The control signal may be removed and the high energy fluid flow will continue to flow in the particular output passage because of a boundary layer effect.

The applicant's invention pertains to a proportional fluid amplifier. A proportional fluid amplifier produces an output signal in one of two output passages which is proportional to the control signal. A proportional output signal is achieved by interfering with the boundary layer effect inherent in the bistable fluid amplifier. This is accomplished by providing a low impedance flow path across the high energy stream of fluid. This prevents the development of a pressure differential across the fluid stream which is the origin of the bistable effect. It should be noted that the output of a typical proportional fluid amplifier is in the form of flow accumulation.

It is necessary in some applications of pure fluid control systems to utilize control means having a static pressure output signal as opposed to a flow accumulation output signal. Heretofore it has been impossible to obtain a satisfactory static pressure output signal from a proportional fluid amplifier. Various techniques have been tried unsuccessfully. The failures being due to high aerodynamic noise levels and substantial time lags in the output signals.

The applicant has provided a unique fluid amplifier control means which provides a static pressure output signal which substantially eliminates the aerodynamic noise and substantially reduces the time lag associated with the output signal. The applicant obtains his output signal by positioning a streamline element within the high energy fluid stream of a proportional fluid amplifier and sensing the pressure differential across such an element. A streamline element in one particular embodiment of the applicant's invention takes the form of a symmetrical airfoil element. The pressure differential across the streamline element of this unique fluid amplifier control means is indicative of the control signal applied to the control means.

It is therefore an object of this invention to provide an improved control apparatus.

Figure 2:
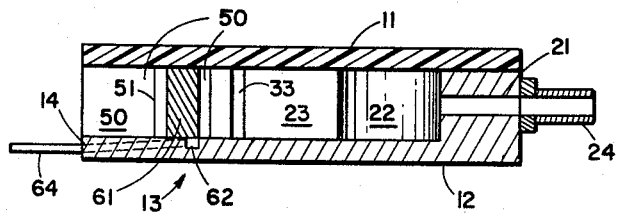

This and other objects of the invention will become apparent from a study of the accompanying specification and claims in conjunction with the drawings, in which:

FIGURE 1 is a plan view of the applicant's unique fluid amplifier control means; and FIGURE 2 is a cross-sectional view taken along section lines 2—2 of FIGURE 1.

Referring now to FIGURES 1 and 2, reference numeral 10 generally depicts the applicant's unique fluid amplifier control means. A transparent, rectangular shaped cover plate is identified by reference numeral 11. It should be pointed out that cover plate 11 need not be fabricated from a transparent material, other types of material may be utilized for cover plate 11.

A body element 12 is provided which cooperates with cover element 11 to define a rectangular shaped housing means 13. One edge of housing means 13 is identified by reference numeral 14. It should be noted that all of the machining operations necessary for the fluid amplifier control means are performed upon body element 12. Cover element 11 merely provides a cover for body element 12. Cover element 11 is attached to body element 12 by suitable means (not shown) such as screws or adhesives.

A fluid supply passage 20 is provided within housing means 13 so as to supply a suitable fluid. Fluid supply passage 20 comprises a fluid conduit 21, a fluid chamber 22, and an orifice 23. It should be pointed out that fluid passage 20 need not be constructed in this particular manner, but it is so constructed so as to provide for ease of machining. A connector means 24 is attached to housing 13 to connect passage 20 to a fluid source (not shown). Passage 20 defines an axis 25. It should be noted that orifice 23 is aligned parallel to axis 25; it is not necessary that conduit 21 be so oriented.

Two fluid control passages 30 and 40 are provided within housing means 13. Fuid control passage 30 comprises a fluid conduit 31, a fluid chamber 32, and an orifice 33. A connector means 34 is attached to housing 13 to connect fluid control passage 30 to a control signal source (not shown). Fluid control passage 40 comprises a fluid conduit 41, a fluid chamber 42, and an orifice 43. A connector means 44 is attached to housing 13 to connect fluid control passage 40 to a control signal source (not shown).

A generally wedged shaped exit chamber 50 is provided within housing 13 having a first wall 51 and a second wall 52. Fluid entering chamber 50 exhausts therefrom along edge 14 of housing 13. It will be noted that supply passage 20, and control passages 30 and 40 are in communication with exit chamber 50. The geometry of the exhaust chamber 50 is not critical to the applicant's invention, and thus may be of any general shape which allows the fluid therein to exhaust therefrom.

A control means 60 is provided within chamber 50 of housing 13. Control means 60 comprises a streamline element 61 which is illustrated in FIGURE 1 as a symmetrical airfoil element. The applicant does not wish to be limited to a symmetrical airfoil, but rather wishes it to be understood that other streamline elements are within the scope of this invention. Streamline element 61 is rigidly attached to the body 12 of housing 13 by suitable means (not shown) and substantially aligned with axis 25. It is not necessary that streamline element 61 be aligned with axis 25, it is sufficient that streamline element 61 be substantially parallel thereto. Streamline element 61 is usually positioned or spaced apart from the end of orifice 23, a distance equal to 6 to 10 times the width of orifice 23. It should be noted that other positions of streamline element 61 aligned with or parallel to axis 25, are permissible, the applicant has merely set forth the optimum useful range.

Control means 60 also comprises pressure ports 62 and 63. Pressure port 62 is positioned adjacent to or contiguous with one side or surface of streamline element 61. Pressure port 63 is positioned adjacent to or contiguous with the other side or surface of streamline element 61. Pressure ports 63 and 62 are positioned contiguous the forward or leading edge of streamline element 61 and generally extend along one-third of its length in the embodiment illustrated. It should be noted that the shape of pressure ports 62 and 63 is not critical, within certain limits. Consequently, the pressure ports may have a square or elliptical or circular cross-section, or may comprise a series of individual openings along the surfaces of streamline element 61. Pressure ports 62 and 63 are connected to suitable output ducts 64 and 65 respectively.

In operation, fluid supply passage 20 is connected to a suitable high energy fluid source (not shown). Fluid flows through connector means 24, conduit 21, chamber 22, orifice 23, and into exit chamber 50, and exhausts therefrom along the surface 14 of housing 13. In the embodiment illustrated in FIGURES 1 and 2, the fluid flowing through orifice 23 and along axis 25 impinges upon streamline element 61 which is also aligned with axis 25. In the absence of any control signals, the fluid flowing through the orifice 23 impinges streamline element 61 such that approximately one-half of the fluid flow is on each side or surface thereof. Thus, the pressure on each side of streamline element 61 is substantially equal, and pressure ports 62 and 63 both sense substantially equal pressures. Pressure ports 62 and 63, by means of ducts 64 and 65, are connected to a suitable control means utilizing a pressure differential signal. It is clear that there will be no differential output signal from the fluid amplifier control means 10 in the absence of any control signals.

When a control signal is received in one of the control passages, that is, when a pressure differential exists between control passages 30 and 40, an output signal indicative thereof is obtained. More specifically, if the fluid pressure in control passage 30 exceeds the fluid pressure in control passage 40, fluid flow will result in orifice 33. The fluid flowing through orifice 33 impinges upon the fluid flowing from orifice 23 along axis 25 and deflects the fluid flow from axis 25. The low energy fluid flowing through orifice 33 and the high energy fluid flowing through orifice 23 are subjected to a momentum interchange at the point of engagement. Vectorial analysis indicates that the resulting fluid flow will be in a direction having a slight angle with axis 25 that is displaced toward wall 52 from axis 25. Thus, the fluid flowing into chamber 50 impinges control means 60 at some particular angle depending upon the control pressure differential existing in control passage 30 (all other parameters being constant).

The fluid flowing in exit chamber 50 before impinging upon streamline element 61 has a certain pressure referred to as a free stream pressure. As the fluid flow impinges upon streamline element 61 at a particular angle, a differential pressure exists across streamline element 61. In the example illustrated, the fluid flowing into exit chamber 50 will be at a slight angle to axis 25, that is displaced slightly toward wall 52 of exit chamber 50. This results in a positive pressure (relative to the free stream pressure) at pressure port 62 and a negative pressure (relative to the free stream pressure) at pressure port 63. The magnitude of the pressure differential between pressure ports 62 and 63 is a function of the angle at which the fluid impinges upon streamline element 61 if the mass flow is maintained constant. The angle at which the fluid impinges streamline element 61 is a function of the pressure differential, all other parameters being held constant. Consequently, the pressure differential between pressure ports 62 and 63 is indicative of the control pressure differential, that is, the pressure differential between control passages 30 and 40. It should be pointed out, that a certain amount of amplification of the output signal is obtained due to the inherent characteristics of a streamline element positioned in a fluid flow.

The applicant has provided a unique fluid amplifier control means which provides a static pressure output signal which is indicative of the control signal pressure differential. The static pressure output signal, characterized by having an extremely low noise level, is obtained by positioning a streamline element within the fluid flow stream and sensing the pressure differential thereacross.

While I have shown and described the specific embodiment of this invention, further modification and improvement will occur to those skilled in the art. I desire to be understood therefore, that this invention is not limited to the particular form shown. I intend in the appended claims to cover all modifications which do not depart from the spirit of the scope of this invention.

I claim as my invention:

1. Apparatus of the class described comprising: a housing element; a fluid supply passage within said housing including an orifice, said orifice of said supply passage defining an axis with respect to said housing; means for connecting said supply passage to a first fluid source; first and second fluid control passages within said housing; means for connecting said first control passage to a second fluid source; means for connecting said second control passage to a third fluid source; an exit chamber within said housing; said supply passage and said first and second control passages being in communication with said chamber; and control means including airfoil means positioned within said chamber aligned with said axis and fixed relative to said housing, said control means further including first and second pressure ports, said first pressure port being positioned contiguous one surface of said airfoil means and said second pressure port being positioned contiguous the other surface of said airfoil means, said first and second pressure ports being in communication with said chamber, a first output duct in communication with said first pressure port, a second output duct in communication with said second pressure port, said apparatus operable to provide a static pressure output signal in said first and said second output ducts which is proportional to a pressure differential between said first and said second control passages.

2. Apparatus of the class described comprising: a housing element; a fluid supply passage within said housing including an orifice, said supply passage adapted to be connected to a first fluid source, said supply passage defining an axis; first fluid control passage within said housing adapted to be connected to a second fluid source; second fluid control passage within said housing adapted to be connected to a third fluid source; an exit chamber within said housing; said supply passage, and said first and said second control passages being in communication with said chamber; and control means including airfoil means positioned within said chamber parallel to said axis and fixed relative to said housing, said control means further including first and second pressure ports, one of said pressure ports being positioned on each side of said airfoil means, said pressure ports being in communication with said chamber, a first output duct in communication with said first pressure port, a second output duct in communication with said second pressure port, said apparatus providing a differential pressure output signal between said output ducts which is indicative of a pressure differential between said passages.

3. Apparatus of the class described comprising: a housing element; a fluid supply passage including an orifice within said housing, said orifice of said supply passage defining an axis; first and second fluid control passages within said housing; an exit chamber within said housing, said orifice of said supply passage and said first and second control passages being in communication with said exit chamber; and control means including streamline means and first and second pressure ports, said streamline means being positioned within said chamber parallel to said axis and being fixed relative to said housing, said first pressure port being positioned adjacent one side of said streamline means and said second pressure port being positioned adjacent the other side of said streamline means, said first and second pressure ports being in communication with said chamber, said apparatus operable to produce a pressure differential between said first and said second pressure ports which is indicative of a pressure differential between said first and second control passages.

4. Apparatus of the class described comprising: a housing element; a fluid supply passage within said housing, said supply passage defining an axis; a pair of fluid control passages within said housing; an exit chamber within said housing, said supply passage and said pair of control passages being in communication with said exit chamber; and control means including streamline means and a plurality of pressure ports, said streamline means positioned within said chamber parallel to said axis and fixed relative to said housing, at least one of said pressure ports being positioned on each side of said streamline means, said pressure ports being in communication with said chamber, said apparatus operable to produce a pressure differential between said pressure ports in response to fluid flow within one of said pair of control passages which is indicative of a pressure differential between said pair of control passages.

5. In a proportional fluid amplifier: a supply passage defining an axis; a pair of control passages; an exit chamber, said chamber being in communication with said supply passage and said control passages; and control means, said control means including streamline means and a pair of pressure ports, said streamline means being substantially aligned with said axis, one of said pressure ports being positioned adjacent each side of said streamline means, said pressure ports being in communication with said chamber, an increase in pressure within one of said control passages being effective to cause a pressure differential between said pressure ports proportional to the increase in pressure.

6. In a fluid amplifier: a supply passage; a plurality of control passages; an exit chamber, said supply passage and said control passage being in communication with said chamber; and control means within said chamber, said control means including streamline means and a plurality of pressure ports, said streamline means being substantially aligned with said supply passage, at least one of said pressure ports being positioned adjacent each side of said streamline means, an increase in pressure within one of said control passages being effective to cause a pressure differential between at least one of said pressure ports on each side of said streamline means proportional to the increase in pressure.

7. In a fluid amplifier: a supply passage defining an axis; a pair of control passages; an exit chamber, said supply passage and said control passages being in communication with said chamber; streamline means within said chamber substantially aligned with said axis, means for indicating a pressure differential between the surface of said streamline means on one side of said axis and the surface of said streamline means on the other side of said axis, said amplifier operable to produce a pressure differential output signal indicative of a pressure differential between said pair of control passages.

References Cited by the Examiner

UNITED STATES PATENTS

| | | | |
|---|---|---|---|
| 1,763,590 | 6/30 | Klemperer | 244—78 |
| 3,027,121 | 3/62 | Griswold | 244—78 |
| 3,039,490 | 6/62 | Carlson | 137—610 |
| 3,053,276 | 9/62 | Woodward | 137—597 |
| 3,093,000 | 6/63 | Ritchie et al. | 73—384 |

OTHER REFERENCES

"Control Engineering," May 1960, vol. 7, #5, pages 26, 28 and 30 (copy in Scientific Library and Group 360).

LAVERNE D. GEIGER, *Primary Examiner.*